Jan. 13, 1931.　　　C. M. HAMBLIN ET AL　　　1,788,765
VALVE
Filed June 15, 1929　　　3 Sheets-Sheet 1

CLYDE M. HAMBLIN
EDW. J. KAISER
INVENTORS

BY Harold Todd
ATTORNEY

Jan. 13, 1931.   C. M. HAMBLIN ET AL   1,788,765
VALVE
Filed June 15, 1929   3 Sheets-Sheet 2

CLYDE M. HAMBLIN
EDW. J. KAISER
INVENTORS

BY Hawes Dodd

ATTORNEY

Jan. 13, 1931.  C. M. HAMBLIN ET AL  1,788,765
VALVE
Filed June 15, 1929   3 Sheets-Sheet 3

CLYDE M. HAMBLIN
EDW. J. KAISER
INVENTORS

BY Harold Dodd
ATTORNEY

Patented Jan. 13, 1931

1,788,765

UNITED STATES PATENT OFFICE

CLYDE M. HAMBLIN AND EDWARD J. KAISER, OF WASHINGTON, DISTRICT OF COLUMBIA

VALVE

Application filed June 15, 1929. Serial No. 371,271.

(GRANTED UNDER THE ACT OF MARCH 3, 1883, AS AMENDED APRIL 30, 1928; 370 O. G. 757)

Our invention relates to a device for the mixing of steam and cold water or hot and cold water wherein the primary object is to provide a valve to automatically regulate the temperature of the mixture discharged.

Another object of our invention is to automatically shut off the steam or hot water supply from a mixing chamber when the cold water supply is stopped.

A further object of our invention is to use a plug cock that has a plug member arranged so that it, the plug member, will not stick to or bind with the body proper but will operate easily and efficiently at all times.

Still another object of our invention is to provide our device with a member that will actuate a valve disc when exposed to hot or cold temperatures whereby the steam or hot water supply is automatically shut off in the event the cold water is stopped.

With the above and other objects in view the invention consists in the construction, combination and arrangement of parts as will be described more fully hereinafter.

Reference is to be had to the accompanying drawings forming a part of this specification, in which like reference characters indicate corresponding parts throughout the several views, and in which Figure 1 is a vertical section of the entire device;

Figure 1:
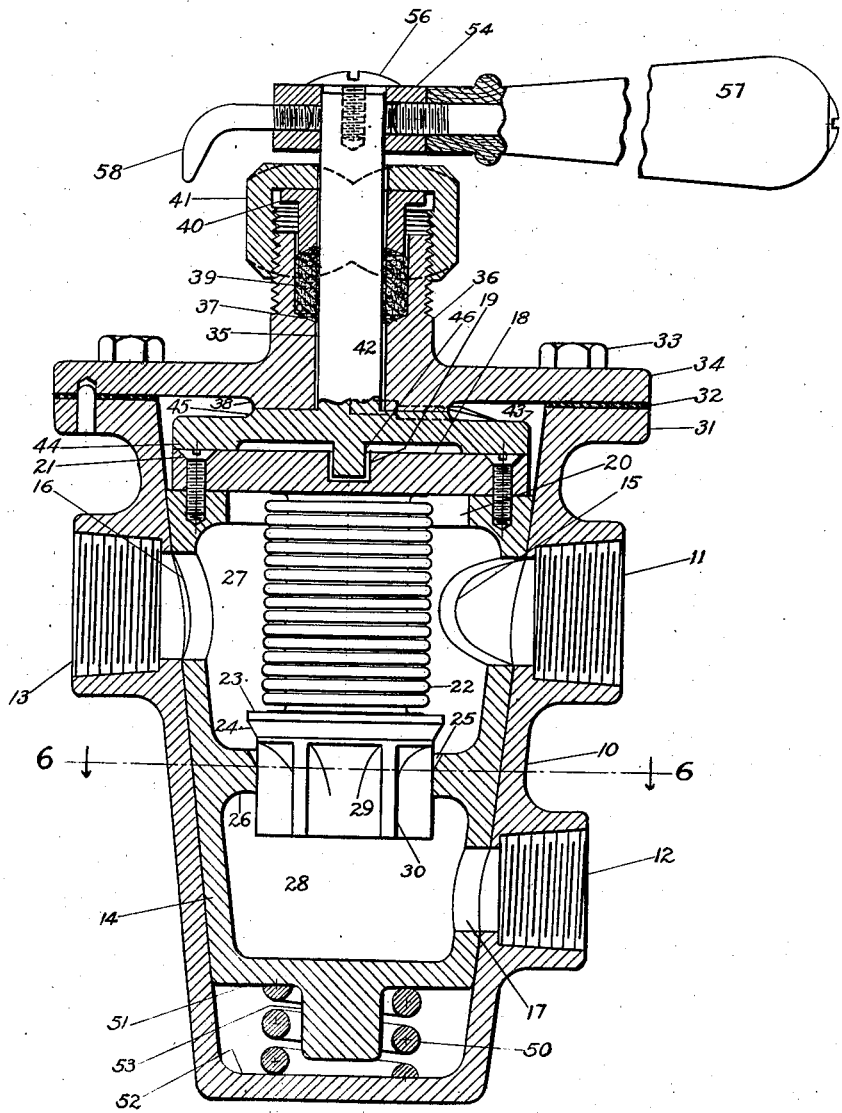
Figure 2:
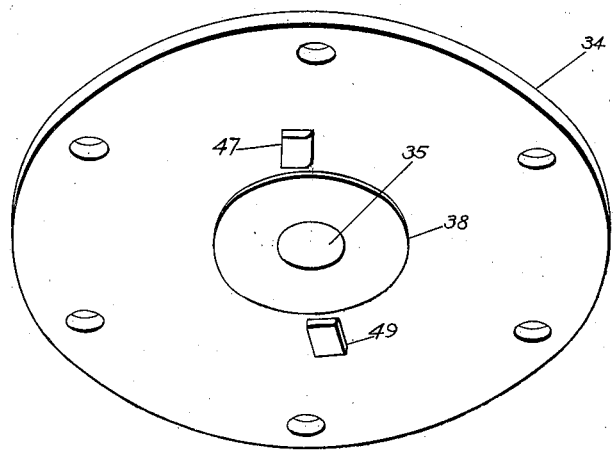
Figure 2 is a perspective view of the under side of the valve top.
Figure 3:
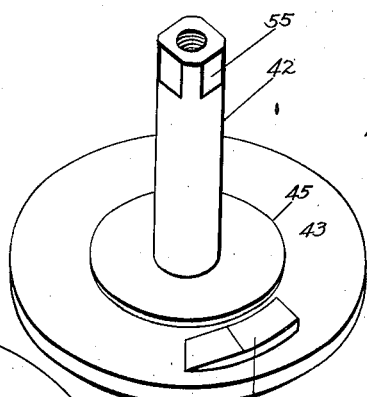
Figure 3 is a perspective view of the upper side of the valve stem.

Referring more particularly to the drawings, 10 indicates a valve body that has a cold water intake 11, a hot water or steam intake 12 and a discharge opening 13. Inserted into the valve body 10 with just enough allowance to permit rotation therein is a plug member 14. The plug 14 has elongated port openings 15 and 16 and port opening 17 arranged so that when plug 14 is rotated in the valve body a portion of ports 15 and 16 will align with the intake 11 and discharge 13 respectively and port 17, after intake 11 and discharge 13 are completely opened, will begin to align with intake 12.

Figure 5:
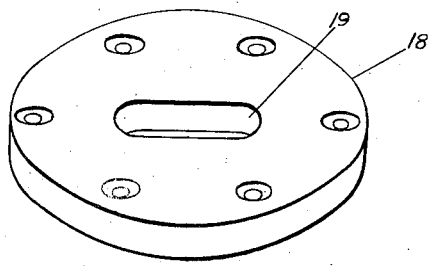
Figure 5 is a perspective view of the cover of the plug member.
Figure 6:
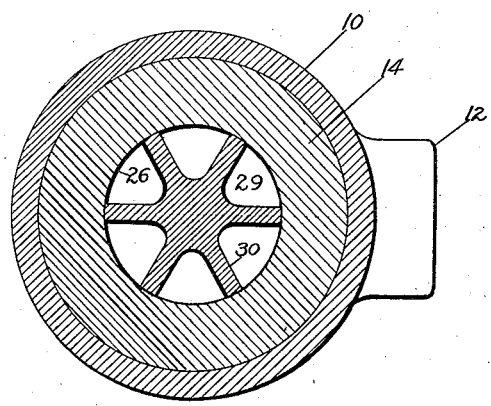
Figure 6 is a cross section of a part of the valve taken on lines 6—6 of Figure 1.

A cover 18 having a keyway or slot 19 on its upper side as shown in Figure 5 is secured to the flanged edge 20 of the plug 14 by the screws 21. Fastened to the under side of the cover 18 is a bellows 22 that has a valve disc 23 fastened to its lower end. The under side of the top of the disc 23 is beveled as at 24 to allow the same to seat into a corresponding beveled seat 25 of an inwardly extending ring 26 provided between ports 15 and 17 integral with the plug member 14. Thus the plug 14 is divided into an upper or mixing chamber 27 and a lower chamber 28 by the disc 23 and the ring 26. The lower end of the disc 23 is corrugated as shown in Figure 6 and has openings 29 and guide vanes 30 bearing against the wall of the ring 26.

The bellows 22 is filled with a medium which causes the bellows to contract when exposed to low temperature and to expand when exposed to high temperature thus controlling the movement of the disc 23 and regulating the admission of steam or hot water through openings 29 to the mixing chamber 27.

It is to be understood that, although reference is made to a bellows, we do not desire to limit our device to this particular structure but any means or member, with or without a medium, that will actuate the valve disc when exposed to hot or cold temperatures can be substituted for the bellows.

The top of the body 10 is provided with an outwardly extending edge 31 to which is firmly secured by means of gasket 32 and screws 33 a cover or bonnet 34 having an aperture 35 in the center thereof. Cast around the aperture 35 and an integral part of the bonnet 34 is a boss 36 having the pocket 37 therein. A flat rim 38 is also around the aperture and integral with the under side of bonnet 34. Inserted into the aperture 35 and fitted for rotation therein by means of packing 39 in the pocket 37, packing gland 40 and gland nut 41 threaded onto boss 36 is a valve stem 42 that has on its lower end valve plate 43. The rim or lower outer edge 44 of the plate 43 rests on the top of cover 18 and a portion 45 of the upper surface of plate 43 is adapted to bear against rim 38 of the bonnet. Integral with the plate 43 and extending from the center thereof is a tong or key 46 engaging in the key way 19 of the plug cover 18. The key way 19 is somewhat wider than key 46 in order to permit a slight rotary movement of the stem 42 before the plug 14 is turned.

On the under side of the bonnet 34 is secured stop 47 that is adapted to engage with a wedge 48 secured to the top of plate 43. A stop 49 to prevent complete rotation of the plug 14 by abutting with the blunt end of wedge 48 is secured in suitable position on the under side of the bonnet 34. A spring 50 is placed between the bottom 51 on the under side of the plug 14 and the bottom 52 of the valve body 10 and is held in position by the guide 53 that is an integral part of the bottom 51. Thus, when closing the valve the wedge 48 rides up on stop 47 and forces the plug 14 firmly in the valve body 10. When opening the valve a slight rotation of the stem is possible by virtue of the difference in width of key 46 and key way 19. This small movement backs wedge 48 off of stop 47 and plug 14 is forced up a slight amount by the spring 50, sufficient to relieve the binding between plug 14 and valve body 10 before the plug begins to rotate.

Figure 7:
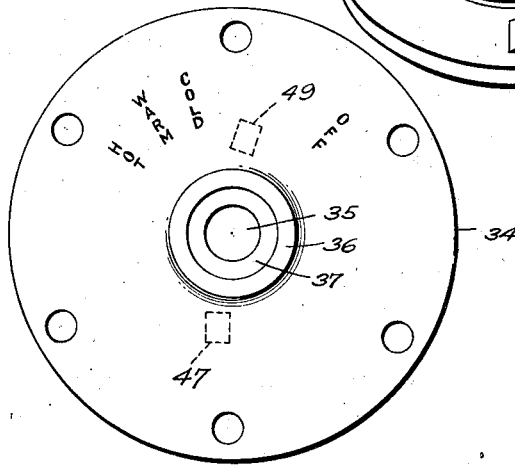
Figure 7 is a plan view of the cover for the valve body.
Figure 4:
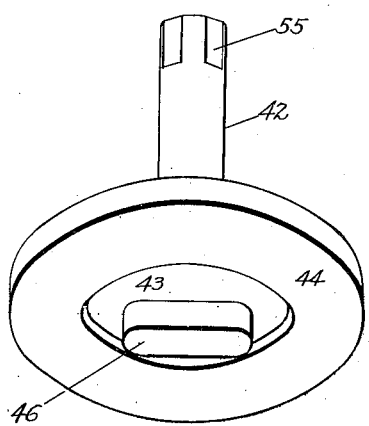
Figure 4 is a perspective view of the lower side of the valve stem.

A handle body 54 is secured to the stem 42 by means of the flat surfaces 55 on the stem proper and a screw 56 threaded into the stem. The handle body 54 is provided with a grip 57 and a pointer 58 adapted to sweep over the top surface of the bonnet with the movement of the valve stem and indicate the various positions of the valve as inscribed on the bonnet surface as shown in Figure 7.

In the practical operation of our improved device, the closed position of the valve is indicated by "Off" on bonnet 34 and a slight turn of the handle will disengage the wedge members 47 and 48 whereby the plug 14 is forced up by spring 50 so that portion 45 of plate 43 bears against the rim 38. In the off position intakes 11 and 12 and the discharge opening 13 are blanked and the steam or hot water or cold water cannot enter the plug ports 17 and 15.

When handle 57 is rotated counter-clockwise so that pointer 58 moves toward the position "Cold" on face of bonnet 34, port 15 in plug 14 starts to uncover intake 11 in the valve body 10 and permits cold water to enter mixing chamber 27. Simultaneously port 16 in plug 14 starts to uncover discharge opening 13 and permits the cold water to be discharged from the chamber 27.

Further rotation of the stem 42 will continue to uncover intake 11 and discharge 13 until the pointer 58 reaches the position "Cold" at which point a full opening of intake 11 and discharge 13 is obtained and the valve is discharging the maximum quantity of cold water. At this point the bellows 22 is completely surrounded with cold water and is in a contracted position, thereby unseating the disc 23 and allowing a passage between chambers 27 and 28. Further counter-clock-wise rotation of the plug 14 will cause port 17 to uncover intake 12 and permit steam or hot water to enter chamber 28 and by way of the opening 29 permit the steam or hot water to enter the mixing chamber 27 and when the pointer 58 is in the position "Hot" a full opening of the steam or hot water intake is obtained and the blunt end of wedge 48 abuts stop 49, thus preventing further rotation of the plug 14. If at any point, while the hot water or steam intake is in an open position, the cold water supply should stop or the temperature of the mixture should exceed a predetermined value, the heat will cause the bellows to expand and the disc 23 will seat tightly on the seat 25, thereby automatically stopping the admission of steam or hot water to the mixing chamber 27.

Variations in the temperature of water in the mixing chamber 27 and consequently of the water discharged caused by variations in the supply of cold water, hot water or steam will cause the bellows 22 to expand or contract, depending on whether the temperature of the water in the mixing chamber 27 is decreasing or increasing, thereby regulating the admission of hot water or steam by regulating the opening between disc 24 and seat 25. This feature automatically regulates the temperature of the discharged water at any setting of the valve from the "warm" position to the "hot" position of the pointer 58.

It will be understood that the above description and accompanying drawings comprehend only the general and preferred embodiment of our invention and that various minor changes in details of construction, proportion and arrangement of parts may be made within the scope of the appended claims and without sacrificing any of the advantages of our invention.

The invention described herein may be manufactured and used by or for the United States Government for governmental purposes without the payment to us of any royalty thereon.

What we claim is:—

1. In a valve comprising a valve body, a plug having a mixing chamber inserted for rotation in said body, a stem having a handle affixed thereto for rotating said plug, means for admitting steam or hot water and cold water into said chamber, a discharge port for said chamber and means whereby said plug is tightened in the extreme closed position in said body by rotating said handle, stem and plug and freed for rotation from the closed position by rotation of said handle and stem just before rotation of said plug begins.

2. In a valve comprising a valve body, a rotary plug having a mixing chamber inserted in said body, means for admitting cold water into said chamber, means for admitting hot water or steam into said chamber, a discharge port and means automatically shutting off said hot water or steam supply from said mixing chamber.

3. In a valve comprising a valve body, a plug having a mixing chamber inserted for rotation in said body, means for admitting cold water and hot water or steam into said chamber, a discharge port, and means for automatically shutting off the hot water or steam supply when the water in the mixing chamber reaches a predetermined temperature.

4. In a valve comprising a valve body having a discharge port, a hot water or steam intake and a cold water intake, a plug having a mixing chamber inserted for rotation in said body, a discharge opening, a hot water or steam port and a cold water port in said plug adapted to align with the discharge port and said intakes respectively of said valve body, and means in said plug for automatically regulating the supply of hot water into the mixing chamber.

5. In a valve comprising a valve body having a discharge port, a cold water intake and a hot water or steam intake, a plug having a mixing chamber and a hot water or steam chamber inserted for rotation in said valve body, a discharge opening from and a cold water port into said mixing chamber adapted to align with the discharge port and cold water intake respectively of said valve body, a hot water or steam port into said hot water or steam chamber adapted to align with said hot water or steam intake of the valve body and means for automatically controlling the supply of hot water or steam from the steam chamber into said mixing chamber.

6. In a valve comprising a valve body having a discharge port, a cold water intake and a hot water or steam intake, a plug inserted for rotation in said valve body, said plug having a discharge port, a cold water intake and a hot water or steam intake, means for rotating said plug in said valve body whereby the said discharge ports and the said intakes will align respectively at some one point with each other and means in said plug automatically regulating the supply of hot water at predetermined temperatures.

7. In a valve comprising a valve body, a plug member having a hot water or steam chamber and a mixing chamber therein inserted for rotation in said body, means for admitting cold water into said mixing chamber and for admitting hot water or steam into said hot water or steam chamber, automatic means for regulating the supply of hot water or steam from the hot water or steam chamber into said mixing chamber and a discharge opening from said mixing chamber.

8. In a valve comprising a valve body, a plug member having a mixing chamber inserted for rotation in said valve body, a valve key for rotating said plug in said valve body, means for admitting cold and hot water or steam into said mixing chamber and regulated by said valve key and automatic means for regulating the supply of hot water or steam into said mixing chamber.

9. In a valve comprising a valve body, a plug member having a mixing chamber therein inserted for rotation in said valve body, means for admitting cold and hot water or steam into said mixing chamber, a valve key having a handle integral therewith for rotating said plug in said valve body to open or close the means for admitting cold and hot water or steam into said mixing chamber, a wedge operating in conjunction with said valve key for tightening said plug in said body in the closed position by rotation of said handle, key and plug and means to relieve the binding between the plug and the body before the plug member begins to rotate from the closed position.

10. In a valve comprising a valve body, a plug member having a mixing chamber therein inserted for rotation in said valve body, means for admitting cold and hot water or steam into said mixing chamber, a valve key having a fixed handle attached thereto for rotating said plug in said valve body to open or close the means for admitting cold and hot water or steam into said mixing chamber, a wedge operating in conjunction with said valve key for tightening said plug in said body in the closed position by rotation of said handle, key and plug and a spring adapted to relieve the binding between the plug and said body when the said wedge is released by a slight rotation of the handle and valve key before the plug members begins to rotate from the closed position.

11. In a valve comprising a valve body, a plug member inserted for rotation in said valve body, intake and discharge openings in said valve body and plug member adapted to align with each other respectively, a valve stem having a handle for rotating said plug in said valve body and means for tightening said plug in said valve body in the closed position by rotating said handle, stem and plug and for relieving the binding of the said plug in the valve body by rotating the handle and stem before rotation of said plug from the closed position begins.

12. In a valve comprising a valve body a plug member having a key way therein inserted for rotation in said valve body, intake and discharge openings in said valve body and plug member adapted to align with each other respectively, a valve stem having a key thereon adapted to loosely fit into said key way for rotating said plug, a handle fitted to said stem, and means for tightening said plug in said valve body in the closed position by rotating said handle, stem, key and plug and for relieving the binding of the said plug in the valve body by rotating said handle, stem and key just before rotation of said plug from the closed position begins.

13. In a valve comprising a valve body a plug member having a key way therein inserted for rotation in said valve body, intake and discharge openings in said valve body and plug member adapted to align with each other respectively, a valve stem having a key thereon adapted to loosely fit into said key way for rotating said plug, wedge members integral with said plug, wedge members integral with said valve stem and the valve body respectively and operating in conjunction with said valve key for tightening said plug in said body in the closed position by rotating said stem, key and plug and means to relieve the binding between the plug and the body by rotating said stem and key before the plug member begins to rotate from the closed position.

14. In a valve comprising a valve body a plug member having a key way therein inserted for rotation in said valve body, intake and discharge openings in said valve body and plug member adapted to align with each other respectively, a valve stem having a key thereon adapted to loosely fit into said key way for rotating said plug, wedge members fixed with respect to said valve stem and valve body respectively and operating in conjunction with said valve key for tightening said plug in said body in the closed position by rotating said stem, key and plug and a spring for providing a clearance between the plug member and the valve body when said wedge members are released by a slight rotation of said stem and of the said key in the key way just before rotation of said plug from the closed position begins.

15. In a valve comprising a valve body, a plug member having a mixing chamber and a hot water or steam chamber therein inserted for rotation in said valve body, means for admitting cold water into said mixing chamber, a discharge opening in said mixing chamber, means for admitting hot water or steam into the said hot water or steam chamber, a valve disc adapted to admit hot water or steam from the hot water or steam chamber into said mixing chamber and means for automatically regulating said disc whereby the water supply in the mixing chamber can be kept at a predetermined temperature and in the event the cold water supply is stopped the hot water or steam supply is entirely shut off.

16. In a valve comprising a valve body, a plug member having a mixing chamber and a hot water or steam chamber therein inserted for rotation in said valve body, means for admitting cold water into said mixing chamber a discharge opening in said mixing chamber, means for admitting hot water or steam into the said hot water or steam chamber, a valve disc adapted to admit hot water or steam from the hot water or steam chamber into said mixing chamber and a thermostatic bellows adapted to expand when exposed to a higher temperature or contract when exposed to a lower temperature for automatically regulating the movement of said valve disc.

17. In a valve comprising a valve body having a discharge port, a cold water intake and a hot water or steam intake, a plug having a mixing chamber and a hot water or steam chamber inserted for rotation in the valve body, a discharge port and a cold water intake in said mixing chamber, a hot water or steam intake in said hot water or steam chamber, a valve key for rotating said plug in said valve body whereby the said discharge ports, and the said intakes will align respectively at some one point with each other, a valve disc adapted to admit hot water or steam from said hot water chamber into said mixing chamber and a bellows having a medium therein adapted to expand when exposed to a higher temperature and contract when exposed to a lower temperature to automatically regulate the movement of said valve disc.

18. In a valve comprising a valve body having a discharge port, a cold water intake and a hot water or steam intake, a plug having a mixing chamber and a hot water or steam chamber, inserted for rotation in the valve body, a discharge port and a cold water intake in said mixing chamber, a hot water or steam intake in said hot water or steam chamber, a valve key for rotating said plug in said valve body whereby the said discharge ports and the said intakes will align respectively at some one point with each other, a valve disc adapted to admit hot water or steam from said hot water chamber into said mixing chamber, a bellows having a medium therein adapted to expand when exposed to a higher temperature and contract when exposed to a lower temperature to automatically regulate the movement of said valve disc, a wedge operating in conjunction with said valve key for tightening said plug in said valve body in the closed position and a spring adapted to relieve the binding between the plug and said valve body when the said wedge is released by a slight rotation of the valve key.

19. In a valve, a valve body member, a plug inserted in said member, means for rotating said plug, means adapted to positively seat said plug in the closed position and means allowing lost motion between said rotating means and the plug whereby the seating means are disengaged without operation of the plug.

20. In a valve, a body, a rotary valve plug in said body, a plug rotating member, and means allowing lost motion between said plug and plug rotating member, and wedging means on the body and plug rotating member for moving the plug axially in the body.

21. In a valve, a body having inlet ports for hot water or steam and cold water and a discharge port, a rotating valve plug having two chambers, one chamber having ports adapted to align one with the cold water port and one with the discharge port of the body, the second chamber having a port adapted to align with the hot water or steam port of the body and a heat controlled valve interposed between said chambers.

22. In a valve a body having inlet ports for hot water or steam and cold water and a discharge port, a rotary valve plug having two chambers, one chamber having ports adapted to align one with the cold water port and one with the discharge port of the body and having a heat responsive element in the chamber between the cold water inlet and the discharge port, the second chamber having a port adapted to align with the hot water or steam port of the body and a heat controlled valve interposed between said chambers.

23. In a valve, a body having hot water or steam and cold water inlet ports and a discharge port, a rotary valve plug having two chambers with a passage between them, one chamber having ports adapted to align simultaneously with the cold water inlet port and discharge port of the body, the second chamber having a port adapted to align with the hot water or steam inlet port and so positioned as to only come into alignment after the cold water inlet port and discharge port are in full alignment and an automatic heat regulating means controlling the passage between said chambers.

CLYDE M. HAMBLIN.
EDWARD J. KAISER.